March 23, 1926.  
W. O. AMSLER  
1,577,602  
PROCESS AND APPARATUS FOR REFINING GLASS  
Filed March 30, 1925
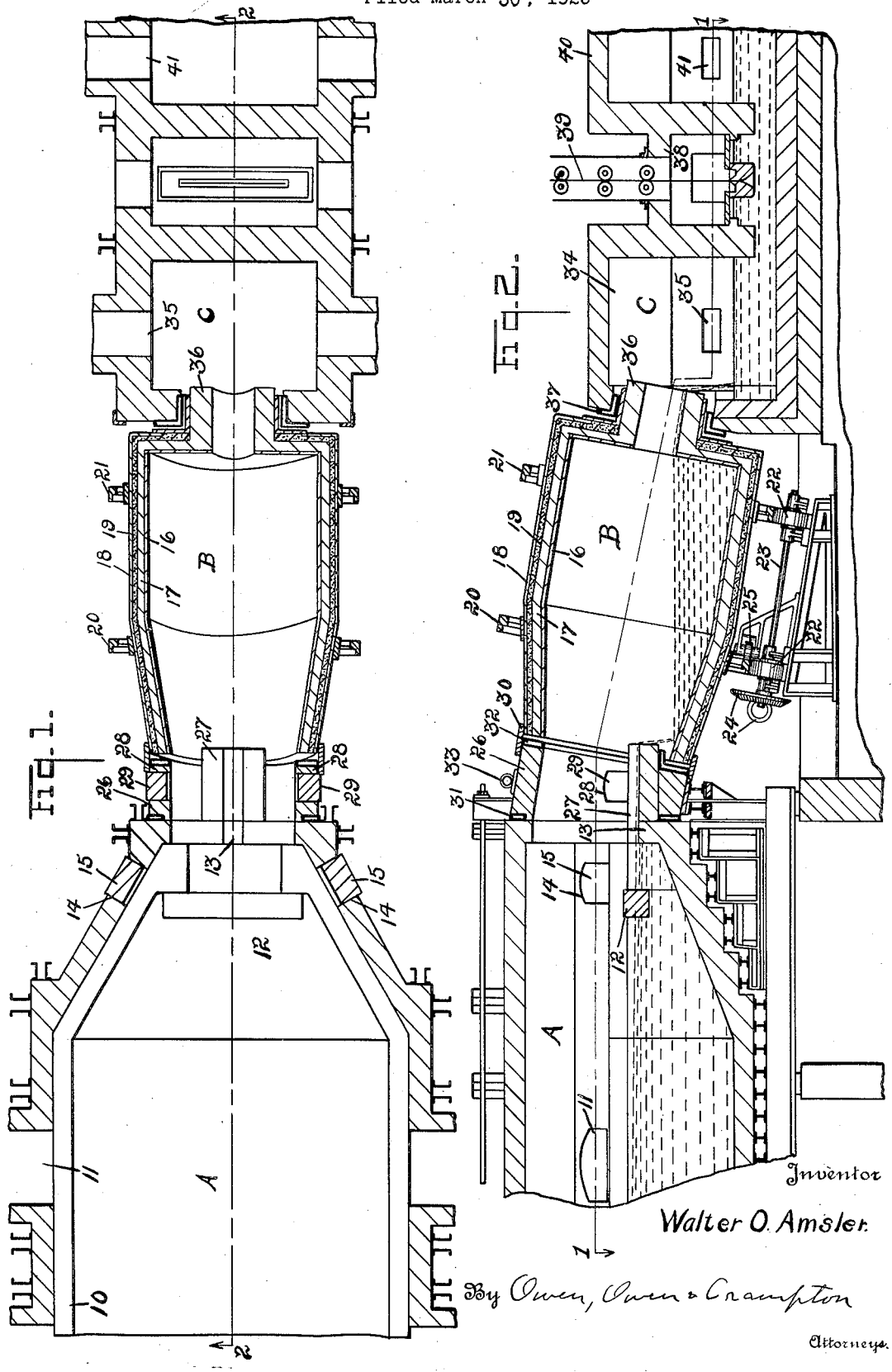
Inventor  
Walter O. Amsler.  
By Owen, Owen & Crampton  
Attorneys.

Patented Mar. 23, 1926.

1,577,602

UNITED STATES PATENT OFFICE.

WALTER O. AMSLER, OF TOLEDO, OHIO.

PROCESS AND APPARATUS FOR REFINING GLASS.

Application filed March 30, 1925. Serial No. 19,265.

*To all whom it may concern:*

Be it known that I, WALTER O. AMSLER, a citizen of the United States, and a resident of Toledo, in the county of Lucas and State of Ohio, have invented a new and useful Process and Apparatus for Refining Glass, which invention is fully set forth in the following specification.

My invention relates to a process and apparatus for refining glass and more particularly for mixing glass during the refining operation to eliminate striæ.

I achieve the objects of my invention by causing the glass to flow, during the refining process, in such a manner that it rolls over and over itself and thereby is thoroughly mixed. Further details of my invention will appear as the description proceeds in connection with the accompanying drawings, in which,—

Figure 1 is a horizontal section on the line 1—1 of Fig. 2 of one form of my improved apparatus adapted to carry out my improved process; Fig. 2 is a vertical section on the line 2—2 of Fig. 1.

The apparatus shown in the drawing comprises a portion of an ordinary tank furnace A, a revolving drum B in position to receive glass from the tank, and a forming apparatus C adapted to receive glass from the drum and form it into sheets.

The tank A comprises a melting portion 10 within which there are a plurality of firing openings 11, only a portion of the tank being shown in the drawing. The glass is melted in the tank in the usual manner and flows beneath a float 12 to a spillway 13 at the end of the tank. Peep holes 14 are provided in the sides of the tank, and are normally closed by blocks 15.

The drum B comprises an inner wall of fire-clay 16 surrounded by a layer of insulating brick 17 within a metallic casing 18. I prefer to use a layer 19 of sand or similar material between the insulating brick and casing to act as a cushion and provide for any irregularities in the insulating brick. The drum is supported by two hoop-like members 20 and 21 supported upon rollers 22. Rollers 22 are mounted upon shaft 23, which in turn is driven by any suitable gearing 24. In practice there will be several of these supporting wheels, only one pair of which need to be driven. The drum is arranged at an angle to the horizontal, and suitable rollers 25 are provided for bearing against the forward edge of hoop 20 in order to retain the drum in proper position.

Between the tank and the drum there is a removable ring 26 carrying a trough 27 which is adapted to register with spillway 13 and direct the glass from the tank into the drum. The sides of ring 26 are provided with peep holes 28 normally closed by blocks 29. A flange ring 30 is provided to cover the joint between ring 26 and the drum. Hollow rings 31 and 32 are provided at the two sides of ring 26, and these hollow rings may be water-cooled when desired. An eye 33 is shown attached to the upper side of ring 26 for use in removing the ring when desired.

In the apparatus shown, the glass-forming means C comprises a receiving chamber 34 having therein a firing opening 35. A spout 36 on the end of the drum directs glass flowing from the drum into receiving chamber 34. A water-cooled ring 37 surrounds spout 36. Receiving chamber 34 communicates with a drawing chamber 38 provided with apparatus for drawing a sheet of glass 39. Glass not drawn upward from chamber 38 may pass on into another receiving chamber 40 with a firing opening 41 for re-heating the glass, which may pass from this chamber to another drawing chamber. As many of these drawing chambers may be provided as desired.

The operation of the apparatus will be readily understood. Glass, thoroughly melted and somewhat refined in tank A, flows into the drum B. Drum B is constantly rotated at a slow speed, which results in giving a flowing movement to the glass in the drum. It will be readily understood that, as one side of the drum rises, the glass in contact with the wall of the drum tends to follow that wall upward, while the upper portion of the glass flows downward onto the wall of the drum on its lowering side. This results in a rolling action something like that of a cartwheel; but the glass is plastic, and the motion is so slow that the top of the pool is flattened by gravity, with a consequent kneading and mixing of the glass which results in uniformity of composition. At the same time the successive contact of all portions of the glass with the wall of the drum, as well as the mixing of the glass resulting from its rolling action, results in thorough uniformity of temperature in the glass.

I prefer to keep the drum at substantially the temperature at which the glass enters it, and the walls of the drum above the glass are heated to this temperature by products of combustion drawn from chamber 34 through the drum into the tank A. It is, of course, possible to raise the temperature of the glass in the drum, or to lower it, by having the walls of the drum hotter or cooler than the glass entering the drum, but the most perfect uniformity obviously results from maintaining the glass at substantially the same temperature during its passage through the drum. The insulating brick prevent the waste of heat and at the same time render it easy to maintain the temperature of the inner surface of the drum substantially uniform.

The primary purpose of water-cooled ring 37 is to prevent flame from passing out through the opening between spout 36 and the wall of chamber 34, which is necessary to furnish free movement for the drum. If desired, the material of the spout and the temperature of ring 37 may be so regulated that the glass will be cooled during its passage through the spout. The temperature is so regulated that when the glass reaches chamber 38 it is in proper condition to be handled by the glass drawing apparatus.

The parts are so constructed that the glass flowing from the tank may be chilled at spillway 13 by sufficiently cooling ring 31 and, when the glass has been frozen at this point, ring 26 may be removed and drum B repaired, or removed and replaced by another drum, and ring 26 may be returned to position or replaced by another ring, as desired.

It might be possible to produce substantialy the same rolling action of the glass during refining by other means than that disclosed, but the apparatus disclosed is very simple and effectual for the purpose. Furthermore, a rotating drum constructed substantially as described is very effective in quickly and thoroughly heating or cooling glass whenever such change of temperature is desired.

Mixing glass during refining is a well known method of preventing or removing striæ, practiced chiefly in making optical glass, where striæ are fatal. My method mixes the glass very uniformly and effectively, and at the same time subjects the glass to uniform heat, giving a product of exceptionally high quality.

The primary object I have in mind is the formation of sheet glass, as indicated in the drawings. The manner in which the sheet glass is formed is no part of my invention, and it is apparent that the broad idea of my invention will be applicable to the formation of other kinds of glassware. It will be apparent, therefore, that various changes may be made in the illustrated process and apparatus without departing from the scope of my invention, as defined in the appended claims.

What I claim is:

1. The process which consists in melting glass, introducing the molten glass into one end of a refining pool, refining the glass in the pool while rolling it about the longitudinal axis of the pool, and discharging the refined glass from the other end of the pool.

2. The process which consists in melting glass, introducing the molten glass into one end of a refining pool, passing a supporting surface beneath the glass continuously from one side to the other of the pool, and discharging the refined glass from the other end of the pool.

3. The process which consists in melting glass, introducing the molten glass into one end of a refining pool, moving a supporting surface beneath the glass from one side of the pool to the other, regulating the temperature of said surface so that it will be of substantially the same temperature as the glass with which it comes in contact, and discharging the refined glass from the other end of the pool.

4. In glass manufacture, the process which consists in flowing glass into a pool at one end, flowing glass from the pool at the other end and causing a continuous current in the glass in the pool around the axis of the stream of glass between the entrance and exit points.

5. In glass manufacture, the process which consists in melting glass, flowing a continuous stream of the bolten glass into a refining pool, giving a continuous rotary flowing motion to the glass in the refining chamber about a substantially horizontal axis, and flowing the glass from the refining pool to glass forming apparatus.

6. The process of forming sheet glass, which consists in melting the glass in a continuously operating furnace, flowing a continuous stream from the furnace into a refining pool, giving the glass in the refining pool a continuous rotary motion about a substantially horizontal axis, and flowing the glass in a continuous stream from the refining pool to sheet forming apparatus.

7. In glass manufacture, the process which consists in flowing a stream of glass from a melting tank into a refining pool, flowing the glass continuously from the refining pool to glass forming apparatus, and giving to the glass in the refining pool a flowing motion in addition to its flow from entrance to exit and over a surface heated to substantially the temperature at which the glass enters the pool.

8. Glass forming apparatus comprising a substantially cylindrical drum, means to rotate the drum about an axis at an angle to the vertical, means for flowing glass into one end of the drum, and means for flowing glass from the other end of the drum to glass forming apparatus.

9. In glass making apparatus, a refining chamber comprising a rotatable drum having axial openings in its opposite ends and adapted to receive glass through one of said openings and deliver it through the other.

10. In glass making apparatus, a melting tank having an outlet spout, a rotary drum having one end in position to receive a continuous stream from said outlet spout, an axial opening in the opposite end of the drum, means to rotate the drum, and sheet glass forming apparatus in position to receive glass flowing from said axial opening.

11. In glass making apparatus, a melting tank, a rotatable drum lined with fire-clay backed by insulating brick and having oppositely positioned axial receiving and discharging openings, the receiving opening being in position to receive molten glass from said tank.

12. In glass making apparatus, a melting tank, a receiving chamber, and a rotatable drum adapted to receive glass from the tank and deliver it to the chamber, there being a continuous passage above the glass from the chamber through the drum to the tank.

In testimony whereof, I have hereunto signed my name to this specification.

WALTER O. AMSLER.